June 14. 1927.
I. H. COHEN
1,632,173
LIGHTING DEVICE
Filed Sept. 28, 1925
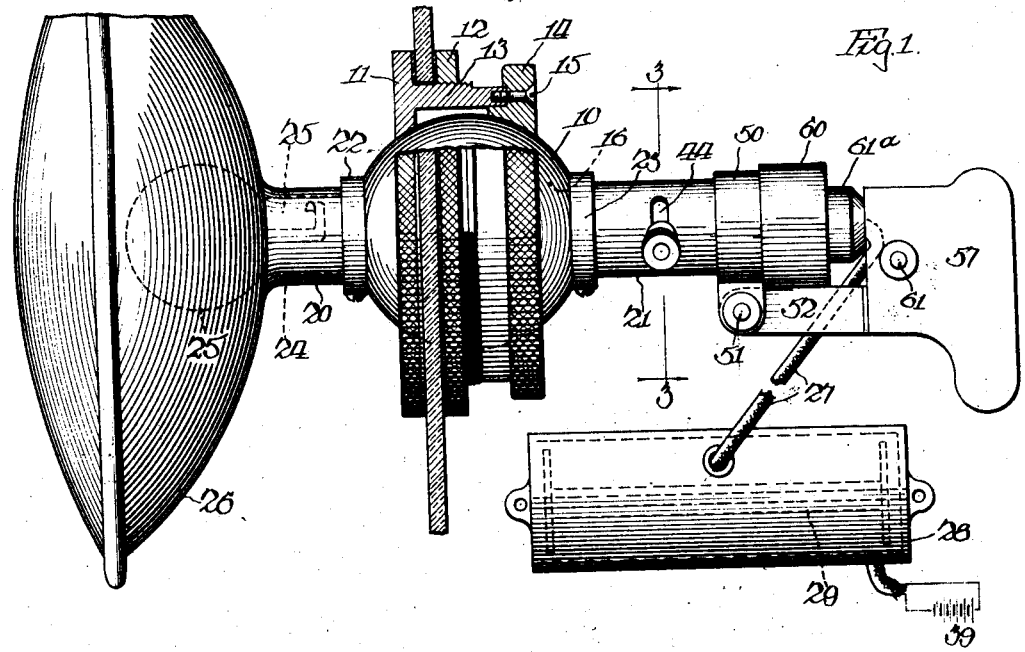
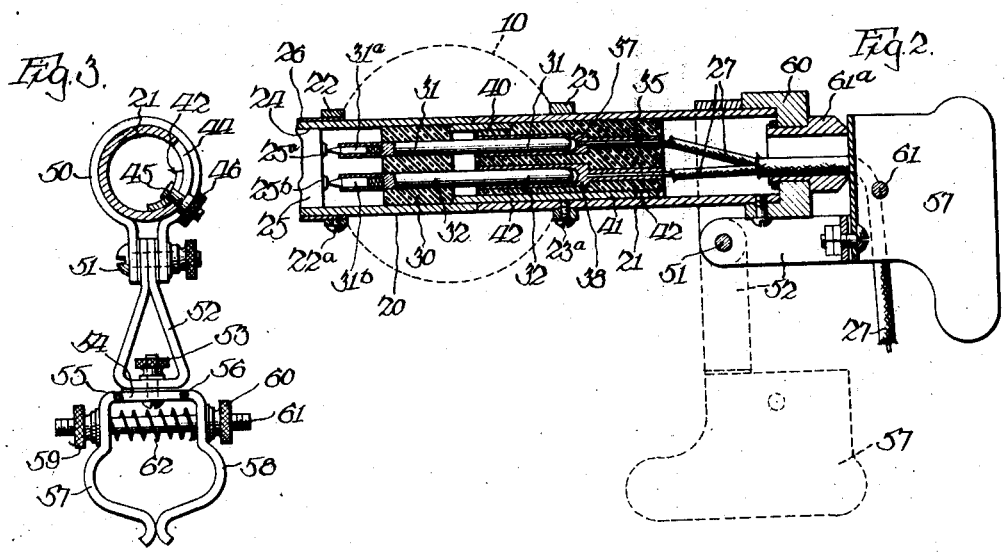
Inventor:
Irving H. Cohen
By Luther Johns
Atty.

Patented June 14, 1927.

1,632,173

UNITED STATES PATENT OFFICE.

IRVING H. COHEN, OF CHICAGO, ILLINOIS, ASSIGNOR OF ONE-HALF TO IRWIN D. GROAK, OF CHICAGO, ILLINOIS.

LIGHTING DEVICE.

Application filed September 28, 1925. Serial No. 58,970.

These improvements will probably find their most usual application in what is known as a spot-light for automobiles, the same being an auxiliary lighting unit mounted near the driver's station and for directional movement. It is old to provide a spotlight secured either to the frame of the wind shield or to the glass panel of the wind shield at an opening therethrough.

The present improvements have for their prime object the provision of a lighting unit adaptable to such uses as the spot-light mentioned and according to which the several lamp members may be readily applied to and removed from the lamp mounting to facilitate assembling and also the ready removal of the unit at times when its use is not desired and to provide a construction whereby such lamp members removed from the mounting may be readily united operatively together to form a portable lamp unit which may be carried by hand and used for locating trouble about the automobile or for other purposes; and to provide in that connection also means for clamping the lamp device proper upon any appropriate part while repair operations, for instance, are being conducted; and to provide such advantages in a lighting device of simple construction and of substantially few parts.

Other objects and advantages will appear hereinafter.

In the drawings, Figure 1 is a side elevation of the device as mounted upon what we will assume to be the glass panel of an automobile wind shield, and showing also a container for a supply of flexible wire; Fig. 2 is a fragmentary medial longitudinal vertical section through the lamp members of Fig. 1; Fig. 3 is a transverse sectional view on the line 3—3 of Fig. 1; and Fig. 4 is a fragmentary side view of the adjacent ends of the two lamp members separated from each other.

Referring to Fig. 1, it is old to provide a ball-and-socket universal joint mounting including a ball as 10, which is ordinarily of hard rubber, a front clamping member 11, a locking nut 12 on the annular stem 13 integral with the front member 11, and a rear socket member 14 held by screws as 15 upon the projection 13. According to this construction the ball may turn in the associated mounting parts. A present variation from what is old with respect to the ball 10 is in the provision of a cylindrical hole 16 diametrically through the ball to accommodate the ends of the novel lamp members used in the present construction.

From Fig. 4 it will appear that I provide two lamp members 20 and 21 directed towards each other, and, as shown in Fig. 2, abutting each other end to end. These are cylindrical members, the outer shells of which are formed of tubing of a common diameter, and when assembled as in Fig. 2 their abutting ends meet approximately midway of the ball 10, there shown by dotted lines. Collars 22 and 23 held by screws upon the lamp members 20 and 21 respectively abut flattened surfaces of the ball 10, and since these collars are adjustable as by screws $22^a$ and $23^a$ respectively, a snug adjustment may be made with the ball to provide the desired tightness and solidity of the connection.

The lamp member 20 has its front end open at 24 to provide a socket for the base of the lamp 25 positioned within the lantern body 26 secured upon the front end of the member 20. The rear end of the lamp member 21 is open to provide for the reception of lead wires 27, shown as a flexible cable, which may extend into a receptacle 28 having a spool 29 for a supply of such cable and which receptacle 28 may be located under the dash of the automobile or at any other convenient place.

From Fig. 2 it will be noted that within the lamp member 20 there is a piece of insulation 30 in which are held and through which extend contact members 31 and 32 projecting forward, the front ends of these contact members being bored to provide for the reception of contact points $31^a$ and $31^b$ spring-pressed forward as shown so as to make contact with the terminals $25^a$ and $25^b$ of the incandescent lamp base 25.

The lamp member 21 is correspondingly provided with insulation 35 in which are rigidly secured sockets 37 and 38 adapted to interengage with the contact plug elements 31 and 32 respectively, the lead wires from the cables being connected as by soldering to rearwardly-projecting stems of the sockets respectively.

From the construction thus far described it will be clear that current supplied by the battery 39 (Fig. 1) will flow through the cable or lead wires 27 in a circuit through the interengaging connection elements and through the incandescent bulb.

From Fig. 4 it will be noted that the lamp member 20 has fixed to it a tubular metallic member 40 having an extension 41 provided at its free end with a notch 42. From Fig. 2 it will be observed that these parts 40 and 41 interfit with the cylindrical sleeve of the lamp member 21, and also that the insulation 35 prevents contact of these parts 40 and 41 with the socket elements 37 and 38. From Figs. 1 and 4 it will be noted that the lamp member 21 is provided with a slot 44, and Fig. 3 shows a headed bolt 45 in this slot, the bolt having a knurled nut 46 for easy manipulation.

From Fig. 3 it will be clear that when the nut 46 is retracted the bolt may bodily be moved so as to come out of the notch 42, releasing the lamp member 20 from the lamp member 21, and also that when it is desired to reconnect these lamp members it is only necessary to telescope their ends together and swing the bolt 45 around so that it enters the notch 42, whereupon a tightening of the nut 46 holds the two members rigidly together. According to this construction the lamp parts may very readily be assembled with the mounting by simply inserting the front member into the hole of the ball 10, inserting the rear member into the hole from the opposite direction, thereby telescoping in end-to-end relation the two lamp members, and thereupon fastening the parts together by means of the bolt 45; and that by merely reversing these operations the two lamp members may very readily be removed from the mounting.

An important feature in this connection is that when the lamp members are thus removed from the mounting they may be reassembled as shown in Fig. 2, effecting the provision of a portable lamp which may be carried around within the limits of the flexible cable for such various purposes as automobilists are constantly finding when on the road at night.

I provide also a bracket for securing the lamp in some fixed position, as upon a fender of the automobile, which is well illustrated in Fig. 3. It comprises first a ring-like clamping member 50 passing around the body of the lamp member 21 and held bound upon it by the bolt 51. The same bolt holds also the intermediate bracket 52 to which is secured as by the bolt and nut 53 a base member 54 to which is hinged at 55 and 56 a pair of clamping arms 57 and 58 respectively adapted to be drawn together by nuts 59 and 60 on the bolt 61, with the spring 62 adapted to push these jaws 57 and 58 apart when the nuts 59 and 60 are retracted. The mounting of the bracket 52 on the bolt 51 permits it to be swung into the relative position shown by full lines in Figs. 1 and 2, in which position it constitutes a handle which the operator grasps in moving the lamp about directionally when mounted as in Fig. 1. The dotted line positions of Fig. 2 show how this clamping member may be moved into various relative positions with respect to the body of the lamp as a whole to direct the light upon particular work after it has been affixed to some other part, and the bolt connection 53, Fig. 3, permits the lamp as a whole to be turned about on that axis also. It is therefore possible to move the lamp about substantially as on a universal joint when it is affixed as a trouble finder, providing unusual flexibility in that respect and a consequent advantage to the user.

The end of the lamp member 22 is shown as being closed by a cap 60 provided with an insulating button 61.

I contemplate as being included in these improvements such variations and departures from what is herein specifically illustrated and described as fall within the scope of the appended claims.

I claim:

1. In a lamp construction the combination of a pair of lamp members one of which comprises a socket for holding a lamp, each lamp member having electrical contacts interengaging with those of the other when the lamp members are applied to each other end to end, and readily releasable catch means independent of said contacts for holding the lamp members readily releasable in end to end relation.

2. In spot-light construction, the combination of a mounting, a lamp member carried thereby for directional movement, means for holding the lamp member readily removable within the mounting, and a combined handle and clamping member carried by said lamp member for moving the lamp member directionally in the mounting and for securing the lamp member upon some other object when removed from the mounting.

3. In an automobile spot-light, the combination of a mounting having means for securing it upon a support and having a hole therethrough, a pair of lamp members carried by said mounting in said hole, one of said lamp members having a socket for a lamp and projecting on one side of the mounting, the other of said lamp members being adapted to receive circuit wires and projecting on the other side of the mounting, interengaging electric contacts carried by said lamp members to complete a circuit through a lamp in said socket, and means for holding said lamp members readily releasably together whereby upon release of said holding means the lamp members may be withdrawn out of said hole from opposite end portions thereof respectively and connected operatively together free of the mounting.

4. In a lighting device of the character described, the combination of a mounting including a member movable for directing the light, said movable member having a hole therethrough, and a pair of lamp members readily insertable into and removable from opposite ends of said hole and adapted substantially to abut each other end to end, one of said lamp members having a lamp socket, the other having means for leading wires for electric current thereinto, said lamp members having interengaging contacts for completing a circuit through a lamp in said socket, and readily operable coacting means carried by said lamp members for holding them operatively together when normally positioned end to end in said hole, the construction and arrangement being such that by releasing said coacting holding means said lamp members may be withdrawn out of said hole and be operatively connected together independently of said mounting.

5. In a lighting device of the character described, the combination of a mounting including a ball member movable for directing the light, said ball member having a hole therethrough, and a pair of cylindrical lamp members readily insertable into and removable from opposite ends of said hole and substantially to abut each other end to end, one of said lamp members having a lamp socket, the other having means for leading wires for electric current thereinto, said lamp members having interengaging contacts for completing a circuit through a lamp in said socket, and readily releasable catch means carried by said lamp members for holding them operatively together when normally positioned end to end in said hole, the construction and arrangement being such that by releasing said coacting holding means said lamp members may be withdrawn out of said hole and be operatively connected together independently of said mounting.

6. In spot-light construction, the combination of a mounting including a member having directional movement, a lamp member carried thereby for directional movement, means for holding the lamp member readily removable upon the mounting, and a clamping member carried by said lamp member for securing the lamp member upon some other object when removed from the mounting, there being a connection between said clamping member and said lamp member providing for moving the lamp member with respect to the clamping member substantially as on a universal joint.

IRVING H. COHEN.